United States Patent
Kim et al.

(10) Patent No.: US 8,455,134 B2
(45) Date of Patent: Jun. 4, 2013

(54) SECONDARY BATTERY WITH INSULATING FILM BETWEEN CURRENT COLLECTORS AND A CASE

(75) Inventors: Yong-Sam Kim, Suwon-si (KR); Byung-Kyu Ahn, Suwon-si (KR)

(73) Assignees: Samsung SDI Co., Ltd., Yongin-si, Gyeonggi-do (KR); Robert Bosch, GmbH, Stuttgart (DE)

( * ) Notice: Subject to any disclaimer, the term of this patent is extended or adjusted under 35 U.S.C. 154(b) by 339 days.

(21) Appl. No.: 12/801,713

(22) Filed: Jun. 22, 2010

(65) Prior Publication Data

US 2011/0104559 A1 May 5, 2011

(30) Foreign Application Priority Data

Oct. 30, 2009 (KR) .................. 10-2009-0104309

(51) Int. Cl.
*H01M 2/02* (2006.01)
(52) U.S. Cl.
USPC ............................ 429/167; 429/163; 429/170
(58) Field of Classification Search
USPC .......................................... 429/167, 163, 170
See application file for complete search history.

(56) References Cited

U.S. PATENT DOCUMENTS

| | | | |
|---|---|---|---|
| 6,083,640 A | 7/2000 | Lee et al. | |
| 2001/0008725 A1 | 7/2001 | Howard | |
| 2004/0191612 A1* | 9/2004 | Akita et al. | 429/94 |
| 2006/0024578 A1* | 2/2006 | Lee | 429/208 |
| 2007/0196729 A1* | 8/2007 | Yamauchi et al. | 429/130 |
| 2009/0011329 A1 | 1/2009 | Yoon | |

FOREIGN PATENT DOCUMENTS

| | | |
|---|---|---|
| DE | 10 2008-008004 A1 | 1/2009 |
| EP | 1482577 A1 | 2/2004 |
| GB | 236316 | 7/1925 |
| KR | 10-2000-0020533 A | 4/2000 |
| KR | 10-2009-0003702 A | 1/2009 |

OTHER PUBLICATIONS

Office Action issued in corresponding Korean application, 10-2009-0104309, dated Mar. 21, 2011.
European Search Report in EP 10188184.5-1227, dated Jan. 17, 2011 (Kim, et al.).
European Office Action in EP 10188184.5-1227, dated Feb. 28, 2012 (Kim et al.).

* cited by examiner

*Primary Examiner* — Zachary Best
(74) *Attorney, Agent, or Firm* — Lee & Morse, P.C.

(57) ABSTRACT

A secondary battery including an electrode assembly, the electrode assembly including a separator between a positive electrode and a negative electrode; current collectors, the current collectors being electrically connected to the positive electrode and the negative electrode, respectively; a case, the case accommodating the electrode assembly and the current collectors; a cap plate, the cap plate coupled to an opening in the case; and an insulating film between the current collectors and the case, the insulating film including a recess corresponding to a shape of at least one of the current collectors and the electrode assembly to offset a vibration of the current collectors with respect to the case.

8 Claims, 4 Drawing Sheets

SECONDARY BATTERY WITH INSULATING FILM BETWEEN CURRENT COLLECTORS AND A CASE

BACKGROUND

1. Field

Embodiments relate to a secondary battery.

2. Description of the Related Art

A secondary battery is a rechargeable battery. Secondary batteries may be used in portable electronic devices, e.g., cellular phones, notebooks, and camcorders. Secondary batteries may also be used to, e.g., drive electric vehicles or hybrid electric vehicles.

The secondary battery may have a structure in which an electrode assembly having a positive electrode, a negative electrode, and a separator that are wound to form a jelly roll structure. The electrode assembly may be installed in the secondary battery through an opening of a case thereof. The opening may be covered by a cap plate. A current collector may be electrically connected to an end of the electrode assembly and an electrode terminal in the cap plate. Thus, when an external terminal is connected to the electrode terminal of the cap plate, current generated by the electrode assembly may be supplied to the external terminal through the current collector and the cap plate.

The current collector may be welded to a corresponding electrode of the electrode assembly so as to create a current path and to support the jelly roll structure.

SUMMARY

Embodiments are directed to a secondary battery, which represents advances over the related art.

It is a feature of an embodiment to provide a second battery having high durability against vibration.

At least one of the above and other features and advantages may be realized by providing a secondary battery including an electrode assembly, the electrode assembly including a separator between a positive electrode and a negative electrode; current collectors, the current collectors being electrically connected to the positive electrode and the negative electrode, respectively; a case, the case accommodating the electrode assembly and the current collectors; a cap plate, the cap plate coupled to an opening in the case; and an insulating film between the current collectors and the case, the insulating film including a recess corresponding to a shape of at least one of the current collectors and the electrode assembly to offset a vibration of the current collectors with respect to the case.

The case may be prismatic type and may include a pair of first walls, the pair of first walls being parallel to a breadth direction of the cap plate and facing each other, a pair of second walls, the pair of second walls being parallel to a length direction of the cap plate, and a third wall, the third wall facing the cap plate and being disposed on a bottom of the case.

A thickness of a portion of the insulating film disposed adjacent to the first walls may be thicker than a thickness of a portion of the insulating film disposed adjacent to the second walls.

A thickness of a portion of the insulating film disposed adjacent to the first walls and the third wall may be thicker than a thickness of a portion of the insulating film adjacent to the second walls.

The secondary battery may further include at least one electrode terminal electrically connected to at least one of the current collectors and protruding through the cap plate.

The insulating film may insulate the electrode assembly from the case.

A thickness of the insulating film may be about 50 μm to about 1 mm.

The secondary battery may be a lithium secondary battery.

At least one of the above and other features and advantages may also be realized by providing an electric vehicle or hybrid electric vehicle including the secondary battery of an embodiment.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
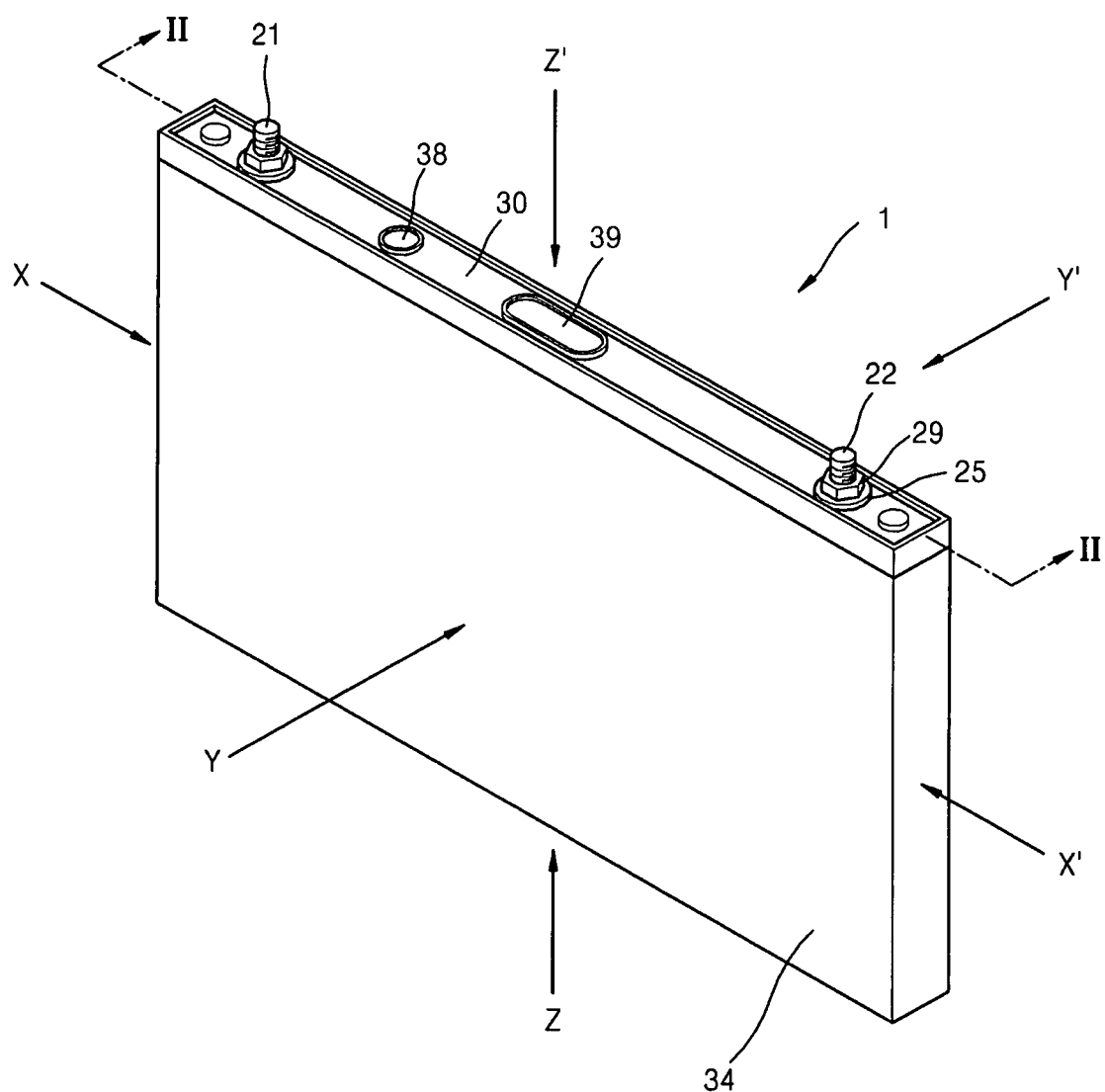
FIG. 1 illustrates a perspective view of a secondary battery according to an embodiment.

Korean Patent Application No. 10-2009-0104309, filed on Oct. 30, 2009, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Figure 2:
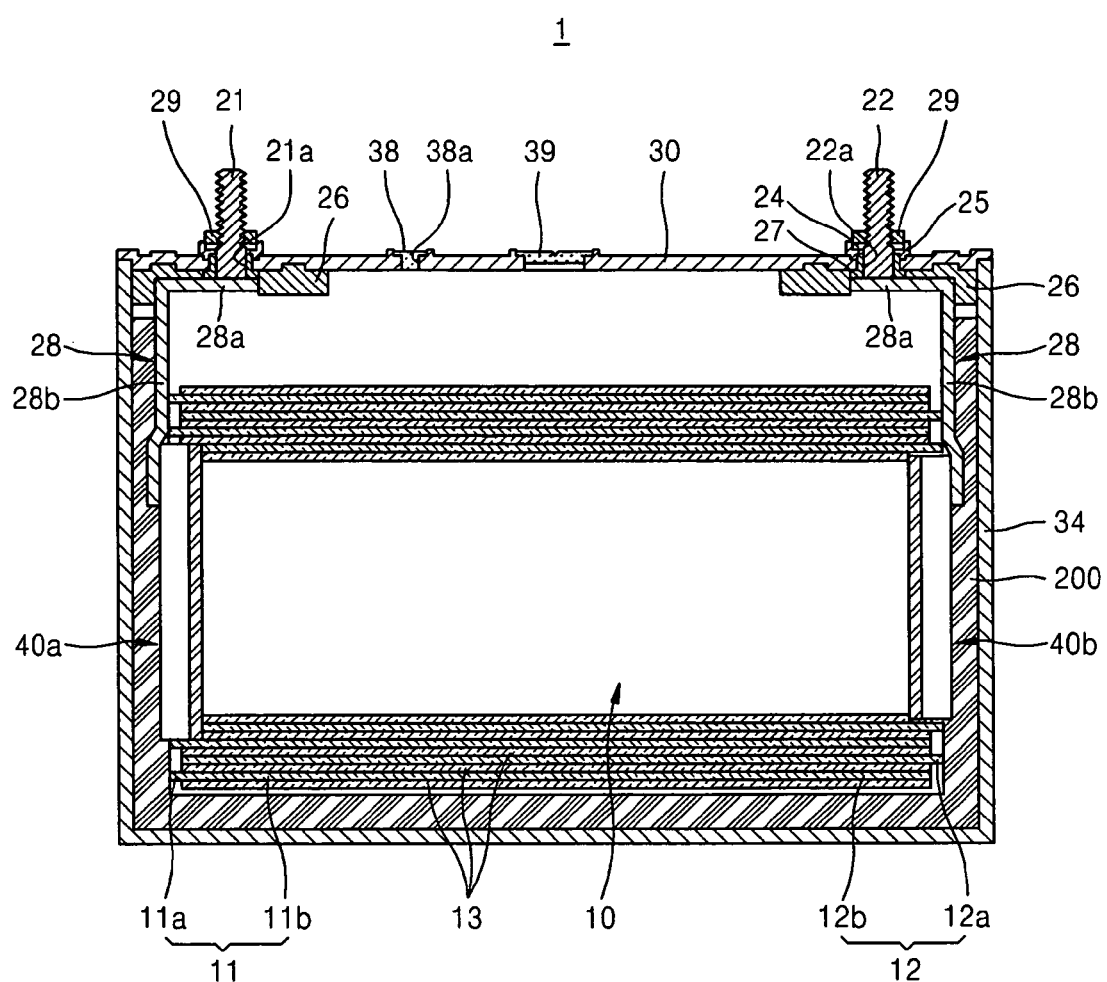
FIG. 2 illustrates a cross-sectional view of the secondary battery of FIG. 1 taken along a line II-II.
Figure 3:
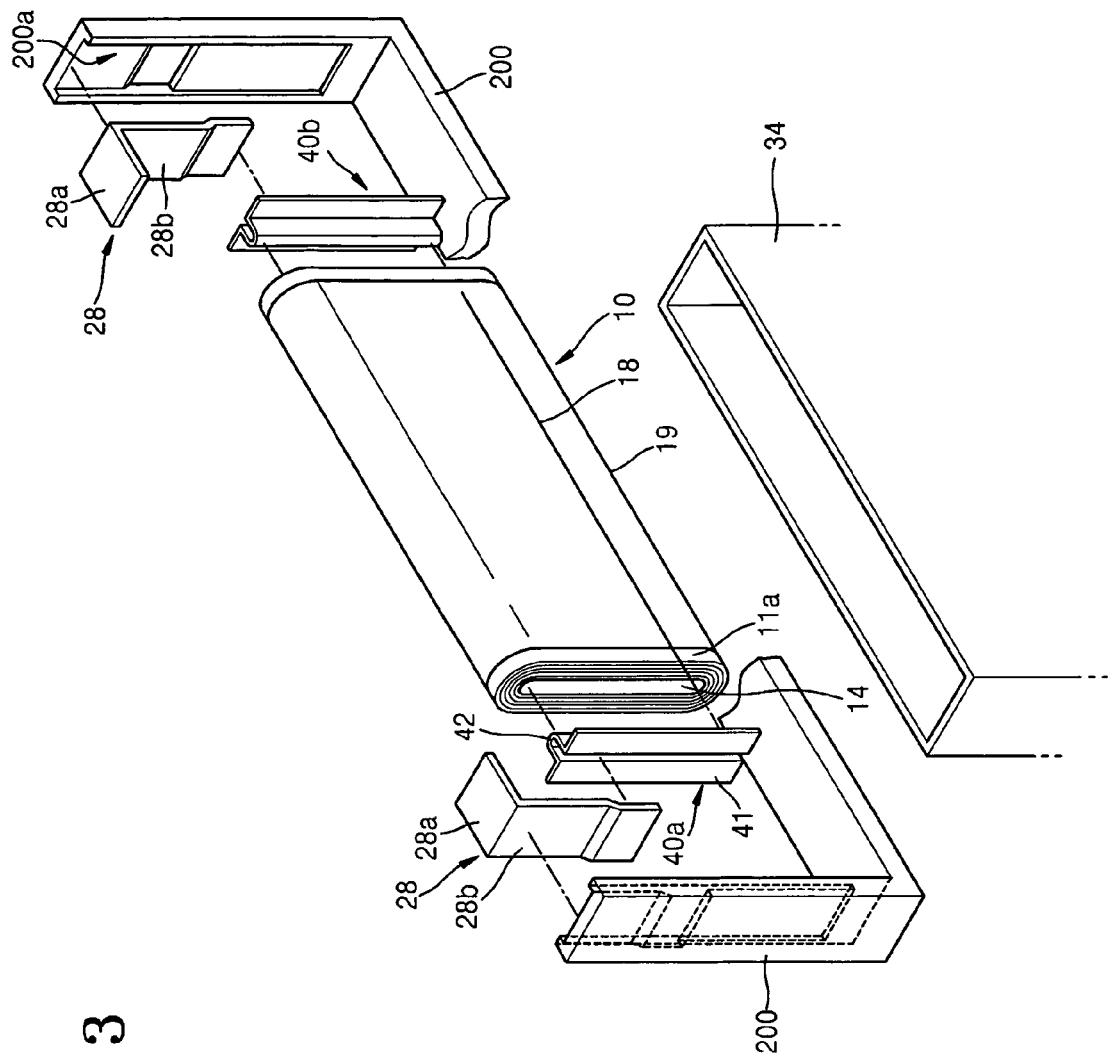
FIG. 3 illustrates a partial exploded perspective view of an electrode assembly, current collectors, a case, and an insulating film of the secondary battery of FIG. 1.

FIG. 1 illustrates a perspective view of a secondary battery 1 according to an embodiment. FIG. 2 illustrates a cross-sectional view of the secondary battery 1 taken along a line II-II of FIG. 1. FIG. 3 illustrates a partial exploded perspective view of an electrode assembly 10, current collectors 40a and 40b, a case 34, and an insulating film, sheet, or sheath 200 of the secondary battery 1 of FIG. 1.

Referring to FIGS. 1 through 3, the secondary battery 1 may include the electrode assembly 10, electrode terminals 21 and 22, the insulating film, sheet, or sheath 200, and the case 34. The case 34 may accommodate the electrode assembly 10. The electrode assembly 10 may be electrically connected to an outside device via the electrode terminals 21 and 22. The insulating film 200 may be disposed between the electrode assembly 10 and the case 34. The insulating film 200 may perform an insulating function between the electrode assembly 10 and the case 34 so as to compensate for, i.e., offset or absorb, vibration of the electrode assembly 10 and the electrode terminals 21 and 22.

The electrode assembly 10 may include a positive electrode 11, a negative electrode 12, and a separator 13. The positive electrode 11, the negative electrode 12, and the separator 13 may be wound such that the separator 13 is disposed between the positive electrode 11 and the negative electrode 12. The positive electrode 11 may include a positive electrode uncoated unit 11a and a positive electrode coated unit 11a. The negative electrode 12 may include a negative electrode uncoated unit 12a and a negative electrode coated unit 12b. The positive electrode uncoated unit 11a and the negative electrode uncoated unit 12a may include a metal foil current collector on which an active material is not coated. The positive electrode coated unit 11b and the negative electrode coated unit 12b may include a metal foil current collector on which an active material is coated. The positive electrode uncoated unit 11a may be formed at a side of the positive electrode 11 in a longitudinal direction of the positive electrode 11. The negative electrode uncoated unit 12a may be formed at a side of the negative electrode 12 in a longitudinal direction of the negative electrode 12. In an implementation, the electrode assembly 10 may include the positive electrode 11, the negative electrode 12, and the separator 13 wound in a cylindrical shape. Then the wound positive electrode 11, negative electrode 12, and separator 13 may be pressed. The electrode assembly 10 may be pressed into a plate shape so as to form a flat portion 18 and a curved portion 19, as illustrated in FIG. 3. The flat portion 18 may be formed by winding the positive electrode 11, the negative electrode 12, and the separator 13 and then pressing the positive electrode 11, the negative electrode 12, and the separator 13 so as to planarize a portion of a circumference of the electrode assembly 10. The curved portion 19 may be disposed at ends of the flat portion 18, both of which may be formed by pressing the electrode assembly 10.

A positive electrode current collector unit 40a may be coupled to the positive electrode uncoated unit 11a of the electrode assembly 10 by, e.g., welding. The positive electrode current collector unit 40a may be electrically connected to a positive electrode terminal 21 via a lead element 28. Thus, the positive electrode terminal 21 may be connected to the positive electrode 11 of the electrode assembly 10 via the lead element 28 and the positive electrode current collector unit 40a. A negative electrode current collector 40b may be electrically connected to a negative electrode terminal 22 via another lead element 28. Thus, the negative electrode terminal 22 may be connected to the negative electrode 12 of the electrode assembly 10 via the other lead element 28 and the negative electrode current collector 40b. An insulating element 26 may be disposed between the lead elements 28 and a cap plate 20 in order to insulate these components from each other. The lead elements 28 may include current collecting lead elements 28b attached to respective current collectors 40a and 40b and terminal lead elements 28a attached to respective electrode terminals 21 and 22.

The electrode terminals 21 and 22 may include the positive electrode terminal 21 and the negative electrode terminal 22. The positive electrode terminal 21 and the negative electrode terminal 22 may be electrically connected to the positive electrode 11 and the negative electrode 12, respectively, and may protrude outside of the case 34.

The cap plate 20 may be coupled to an end of the case 34. The case 34 may have a can shape having an open side. Thus, the open side may be sealed by the cap plate 20. The electrode assembly 10 together with electrolyte may be accommodated in the case 34 through the open side. The cap plate 20 may cover the case 34 such that the electrode terminals 21 and 22 are exposed to the outside. An interface between the case 34 and the cap plate 20 may be welded using, e.g., a laser, so as to seal the case 34 in which the electrode assembly 10 together with the electrolyte are accommodated. The cap plate 20 may have a thin plate shape. An electrolyte inlet 38a for injecting the electrolyte may be formed in the cap plate 20. A sealing cap 38 may be inserted into the electrolyte inlet 38a. A vent element 39 including a groove may be formed in the cap plate 20 so as to be capable of being broken open by a predetermined internal pressure in the case 34.

The insulating film 200 will now be described. With reference to FIG. 1, the case 34 of the secondary battery 1 may include first walls X and X', second walls Y and Y', and a third wall Z. The first walls X and X' may be parallel to a breadth direction of the cap plate 20 and may face each other. The second walls Y and Y' are in parallel to a longitudinal direction of the cap plate 20 and may face each other. The third wall Z may face the cap plate 20 so as to constitute a bottom of the case 34. The cap plate 20 may be formed on a Z' plane. In this case, when, e.g., a rotational and/or vibrational force, are applied to the secondary battery 1, it may not be easy to move the electrode assembly 10 with respect to the second walls Y and Y', i.e., in a direction orthogonal thereto, due to the thickness of the electrode assembly 10. However, a space may exist between the electrode assembly 10 and the first walls X and X' or the third wall Z of the case 34, i.e., in a direction orthogonal thereto. Accordingly, the electrode assembly 10 may be affected by the vibrational and/or rotational force. That is, the electrode assembly 10 may move with respect to the first walls X and X' and/or the third wall Z of the case 34. If the secondary battery 1 is a medium or large-sized second battery, a relatively large space may exist between the electrode assembly 10 and the case 34 such that the electrode assembly 10 may be seriously affected by the, e.g., vibrational and/or rotational force.

As illustrated in FIGS. 2 and 3, the insulating film 200 may surround the electrode assembly 10 and the current collectors 40a and 40b. In this regard, a recess corresponding to the electrode assembly 10 and/or the current collectors 40a and 40b may be formed in the insulating film 200. The insulating film 200 including the recess may perform an insulating function, and may compensate for, i.e., absorb, vibration of the electrode assembly 10, the current collectors 40a and 40b, and the lead element 28 with respect to the case 34. In such case, as illustrated in FIG. 3, the recess may be formed in the insulating film 200 so as to correspond to a shape of the current collectors 40a and 40b, and thus the current collectors 40a and 40b may be held in place relative to the case 34, rather than oscillating with respect to the case 34. Referring to FIG. 3, a thickness of each portion of the insulating film 200 disposed on the first walls X and X' may be thicker than a thickness of each portion of the insulating film 200 disposed on the second walls Y and Y'. That is, a space between the first walls X and X' may be filled by forming with a thicker thickness each portion of the insulating film 200 disposed on the first walls X and X' than that of each portion of the insulating film 200 disposed on the second walls Y and Y'. Further, the current collectors 40a and 40b and the case 34 may be integrated with each other, i.e., may be fixed relative to one another, by forming the recess in the insulating film 200.

However, the position and shape of the insulating film 200 are not limited to any particular form or arrangement described above. That is, the thickness of each portion of the insulating film 200 disposed on the first walls X and X' and the third wall Z may be greater than that of each portion of the insulating film 200 disposed on the second walls Y and Y'. In an implementation, a thickness of the insulating film 200 adjacent to the pair of first walls X, X' may be thicker than a thickness of the insulating film 200 adjacent to the pair of second walls Y, Y'. In another implementation, the thickness of the insulating film 200 adjacent to the pair of first walls X, X' and the third wall Z may be thicker than the thickness of the insulating film 200 adjacent the pair of second walls Y, Y'. In yet another implementation, the thickness of the insulating film 200 adjacent to the third wall Z may be thicker than the thickness of the insulating film 200 adjacent to the pair of second walls Y, Y'. Vibration of the electrode assembly 10 may be prevented by forming a relatively thick portion of the insulating film 200 adjacent to a wall where space exists.

The thickness of the insulating film 200 may be, e.g., about 50 μm to about 1 mm. The insulating film 200 including the recess may be formed as a straight line shape along a plane of walls of the case 34. The recess of the insulating film 200 may be formed so as to correspond to a shape of the current collectors 40a and 40b and/or the electrode assembly 10. Alternatively, the recess of the insulating film 200 may be formed to include, e.g., unevenness, i.e., a protuberance pattern, or an elastic element, rather than corresponding to the shape of the current collectors 40a and 40b or the electrode assembly 10.

Terminal holes 21a and 22a may be formed through the cap plate 20. The terminal holes 21a and 22a may include a positive electrode terminal hole 21a and a negative electrode terminal hole 22a. The positive electrode terminal 21 may protrude through the positive electrode terminal hole 21a. The negative electrode terminal 22 may protrude through the negative electrode terminal hole 22a. An upper gasket 25 and a lower gasket 27 may be disposed between the cap plate 20 and the electrode terminals 21 and 22 so as to insulate the cap plate 20 from the electrode terminals 21 and 22. The lower gasket 27 may be inserted into the respective terminal holes 21a and 22a so as to be disposed at a lower portion of the cap plate 20. The upper gasket 25 may be installed at an upper portion of the cap plate 20. A washer 24 for buffering a clamping force may be installed on the upper gasket 25. Screw threads may be formed on the positive electrode terminal 21 and the negative electrode terminal 22, respectively, so as to be coupled to a nut 29. The nut 29 may support the electrode terminals 21 and 22 from above.

However, the embodiments are not limited thereto. In an implementation, the electrode terminals 21 and 22 may be formed as rivets. In such case, a portion of the electrode terminals 21 and 22 may protrude through the terminal holes 21a and 22a. The upper gasket 25 may be inserted into the terminal holes 21a and 22a and surround a portion of the electrode terminals 21 and 22 that protrudes through the terminal holes 21 and 22a. The portion of the electrode terminals 21 and 22 that protrudes may be compressed so that the electrode terminals 21 and 22 are widely flattened. Thus, the electrode terminals 21 and 22 may be fixed to the cap plate 20.

According to the embodiments, the secondary battery 1 may be a lithium-ion battery, but is not limited thereto. The secondary battery 1 may be, e.g., a nickel-cadmium secondary battery, a nickel-hydrogen secondary battery, or a lithium battery.

According to the embodiments, the secondary battery 1 may have a square, i.e., prismatic or hexahedral, shape, as illustrated in FIGS. 1 through 3, but is not limited thereto. The secondary battery 1 may be, e.g., a cylindrical battery or a pouch type battery.

The positive electrode 11, the current collectors 40a and 40b, and the lead element 28 that are electrically connected to each other may be formed of the same material, e.g., aluminum (Al). In this case, a positive electrode short circuiting induction element (not illustrated) may be formed of the same material as that of the lead element 28, e.g., aluminum (Al). The lead element 28 may be integrally formed with the positive electrode short circuiting induction element or may be connected to the positive electrode short circuiting induction element by, e.g., welding.

The negative electrode 12, the current collectors 40a and 40b, and the lead element 28 that are electrically connected may be formed of the same material, e.g., copper (Cu). In this case, a negative electrode short circuiting induction element (not illustrated) may be formed of the same material as that of the lead element 28, e.g., copper (Cu). The lead element 28 may be integrally formed with the negative electrode short circuiting induction element or may be connected to the negative electrode short circuiting induction element by, e.g., welding.

An internal space 14 may be formed in the center of the electrode assembly 10 by compressing the electrode assembly 10 into a flat shape while the electrode assembly 10 is wound. Each of the current collectors 40a and 40b may include a support protrusion 42 inserted into the internal space 14. The current collectors 40a and 40b may also include an attachment plate 41 coupled to a lateral end of the electrode assembly 10 so as to compress the positive electrode uncoated unit 11a and the negative electrode uncoated unit 12a and welded thereto.

The support protrusion 42 may extend from a center of a width direction of the respective current collector 40a or 40b along a longitudinal direction of the current collector 40a or 40b. The height of the support protrusion 42 may correspond to the height of the internal space 14 of the electrode assembly 10.

The support protrusion 42 may be inserted into the internal space 14 of the electrode assembly 10 so as to support the electrode assembly 10, thereby preventing contact errors between the electrode assembly 10 and the current collectors 40a and 40b caused by external shocks. The support protrusion 42 may support the electrode assembly 10 in a width direction of the internal space 14 as well as in a longitudinal direction of the internal space 14, thereby stably supporting the electrode assembly 10.

The attachment plates 41 may be disposed at both lateral ends of the support protrusion 42. The attachment plates 41 may be coupled to lateral end surfaces of the electrode assembly 10 so as to compress the positive electrode uncoated unit 11a and the negative electrode uncoated unit 12a. The lateral end surface is a surface perpendicular to a central axis when the electrode assembly 10 is wound.

Thus, the attachment plates 41 may contact the respective positive electrode uncoated unit 11a and negative electrode uncoated unit 12a over a relatively large area. The attachment plate 41 may be attached to the lateral end surface of the electrode assembly 10 by, e.g., laser welding. When the attachment plate 41 is attached by laser welding, a thickness of each of the current collector units 40a and 40b may be thicker than in a case where the attachment plate 41 is attached by ultrasonic welding, thereby reducing a resistance of each of the current collector units 40a and 40b.

Since the current collectors 40a and 40b may be fixed to lateral ends of the respective positive electrode uncoated unit 11a and the negative electrode uncoated unit 12a, an entire output of the electrode assembly 10 may be increased by reducing an area of each of the positive electrode uncoated unit 11a and negative electrode uncoated unit 12a and increasing an area of each of the coated units 11.b and 12b.

However, the structure of the secondary battery 1 is not limited thereto. According to another embodiment, the upper gasket 25, the insulating element 26, and the lower gasket 27 for electrically separating the positive electrode 11 or the negative electrode 12 from the cap plate 20 may not be installed in one of the positive electrode terminal 21 or the negative electrode terminal 22. For example, the upper gasket 25 and the lower gasket 27 may not be installed between the positive electrode terminal 21 and the cap plate 20; and the insulating element 26 may not be installed between the lead element 28 and the cap plate 20 at the positive electrode terminal 21. In this case, the positive electrode terminal 21 may pass directly through the positive electrode terminal hole 21a so as to contact the cap plate 20 without the upper gasket 25 and the lower gasket 27. In addition, the lead element 28 may contact the cap plate 20 directly. In this case, the cap plate 20 and the case 34 may have the same polarity as that of the positive electrode terminal 21.

Figure 4:
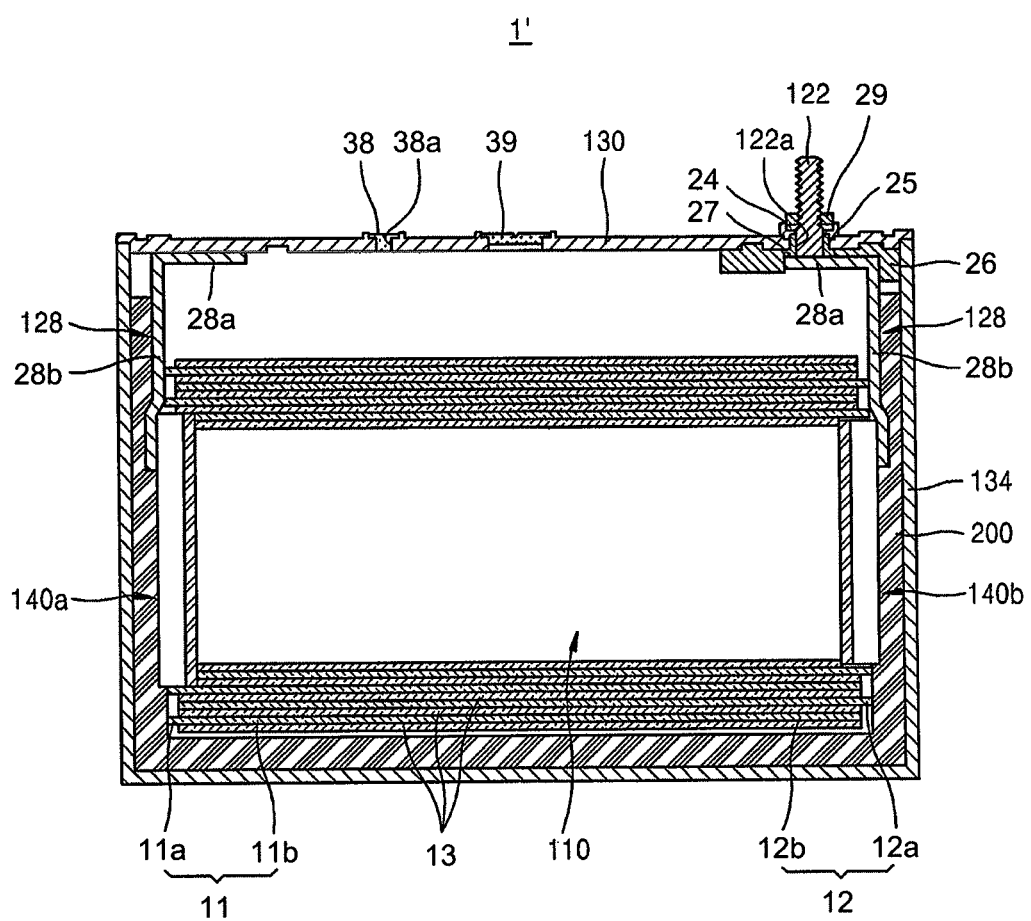
FIG. 4 illustrates a cross-sectional view of a secondary battery according to another embodiment.

FIG. 4 illustrates a cross-sectional view of a secondary battery 1' according to another embodiment. Comparing the secondary battery 1' with the secondary battery 1 of FIGS. 1 and 2, FIG. 4 illustrates a case where the upper gasket 25, the insulating element 26, and the lower gasket 27 for electrically separating a positive electrode terminal (not visible) or a negative electrode terminal 122 from a cap plate 130 are not installed in a positive electrode terminal hole (not visible) or a negative electrode terminal hole 122a.

Like reference numerals in FIGS. 1, 2, and 4 denote like elements, and thus their description will be omitted. The secondary battery 1 is referred to in order to understand the secondary battery 1'.

Referring to FIG. 4, in the secondary battery 1', the upper gasket 25 and the lower gasket 27 may not be installed between the positive electrode terminal and the cap plate 130; and the insulating element 26 may not be installed between a lead element 128 and the cap plate 130 at the positive electrode terminal.

In this case, the positive electrode terminal may pass directly through a positive electrode terminal hole so as to contact the cap plate 130 without the upper gasket 25 and the lower gasket 27. In addition, the lead element 128 at the positive electrode terminal may directly contact the cap plate 130. With such an arrangement, the cap plate 130 and a case 134 may have the same polarity as that of the positive electrode terminal.

In an implementation, the insulating film 200 including a recess may be disposed between the electrode assembly 10 and the case 34, as illustrated in FIGS. 1, 2, 3, and 4. That is, the electrode assembly 10 and the case 34 may be insulated from each other. As illustrated in FIG. 4, a negative electrode current collector unit 140b may be electrically connected to the negative electrode terminal 122 and insulated from the case 34. A positive electrode current collector unit 140a does not have to be insulated from the case 34. However, in order to prevent shaking and movement of the electrode assembly 10 due to vibration of the case 34, the insulating film 200 including the recess corresponding to a shape of the current collector units 140a or 140b and/or the electrode assembly 110 may be included to insulate and/or to compensate for the effects of vibration.

The secondary battery of an embodiment may be used in an electric or hybrid electric vehicle, e.g., an electric or hybrid electric car, an electric bicycle, an electric scooter, and the like.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
   an electrode assembly, the electrode assembly including a separator between a positive electrode and a negative electrode;
   current collectors, the current collectors being electrically connected to the positive electrode and the negative electrode, respectively;
   a case, the case accommodating the electrode assembly and the current collectors;
   a cap plate, the cap plate coupled to an opening in the case; and
   an insulating film between the current collectors and the case, the insulating film including a recess corresponding to a shape of at least one of the current collectors and the electrode assembly to offset a vibration of the current collectors with respect to the case, wherein:
   the case is a prismatic type and includes:
      a pair of first walls, the pair of first walls being parallel to a breadth direction of the cap plate and facing each other,
      a pair of second walls, the pair of second walls being parallel to a length direction of the cap plate, and
      a third wall, the third wall facing the cap plate and being disposed on a bottom of the case, and
   wherein a thickness in a direction orthogonal to a plane of the second walls of all portions of the insulating film disposed adjacent to the second walls and not adjacent to the first walls and third wall is thinner than a thickness in a direction orthogonal to a plane of the first walls of all portions of the insulating film disposed adjacent to the first walls and not adjacent to the second walls and the third wall and thinner than a thickness in a direction orthogonal to a plane of the third wall of all portions of the insulating film disposed adjacent to the third wall and not adjacent to the first walls and the second walls.

2. The secondary battery as claimed in claim 1, further comprising at least one electrode terminal electrically connected to at least one of the current collectors and protruding through the cap plate.

3. The secondary battery as claimed in claim 1, wherein the insulating film insulates the electrode assembly from the case.

4. The secondary battery as claimed in claim 1, wherein a thickness of the insulating film is about 50 μm to about 1 mm.

5. The secondary battery as claimed in claim 1, wherein the secondary battery is a lithium secondary battery.

6. An electric vehicle or hybrid electric vehicle including the secondary battery as claimed in claim 1.

7. The secondary battery as claimed in claim 1, wherein the insulating film extends along an entirety of the third wall.

8. The secondary battery as claimed in claim 1, wherein the insulating film is a one-piece insulating film.

* * * * *